(12) United States Patent
Liao

(10) Patent No.: US 8,480,098 B2
(45) Date of Patent: Jul. 9, 2013

(54) GOLF BAG CART

(75) Inventor: Gordon Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 123 days.

(21) Appl. No.: 13/228,550

(22) Filed: Sep. 9, 2011

(65) Prior Publication Data

US 2013/0062865 A1    Mar. 14, 2013

(51) Int. Cl.
*B62B 1/10*    (2006.01)

(52) U.S. Cl.
USPC ................... 280/47.26; 280/47.28; 280/47.29

(58) Field of Classification Search
USPC ..................................... 280/47.26–47.29, 652
See application file for complete search history.

(56) References Cited

U.S. PATENT DOCUMENTS

| | | | | |
|---|---|---|---|---|
| 4,289,326 A * | 9/1981 | Hawkes | ......................... | 280/646 |
| 4,302,029 A * | 11/1981 | Albertson | ..................... | 280/646 |
| 5,143,399 A * | 9/1992 | Liu | .............................. | 280/646 |
| 5,421,604 A * | 6/1995 | Wu | ................................ | 280/655 |
| 5,526,894 A * | 6/1996 | Wang | ........................... | 180/65.1 |
| 5,582,421 A * | 12/1996 | Liu | .............................. | 280/646 |
| 6,050,592 A * | 4/2000 | Kim | .............................. | 280/652 |
| 6,099,024 A * | 8/2000 | Liao | ............................. | 280/655 |
| 6,126,184 A * | 10/2000 | Liao | ......................... | 280/47.371 |
| 6,131,917 A * | 10/2000 | Walsh | .......................... | 280/43.1 |
| 6,186,520 B1 * | 2/2001 | Barten | ........................... | 280/30 |
| 6,193,264 B1 * | 2/2001 | Seon | ............................. | 280/652 |
| 6,481,518 B1 * | 11/2002 | Wu | .............................. | 180/65.6 |
| 6,695,324 B1 * | 2/2004 | Wu | ........................... | 280/47.315 |
| 6,698,789 B2 * | 3/2004 | Reimers et al. | ................ | 280/651 |
| 6,886,852 B2 * | 5/2005 | Cheng et al. | ................... | 280/651 |
| 6,918,604 B2 * | 7/2005 | Liao | ........................... | 280/47.26 |
| 7,063,340 B1 * | 6/2006 | Wu | ............................ | 280/47.26 |
| 7,063,347 B1 * | 6/2006 | Wu | ................................ | 280/652 |
| 7,121,563 B1 * | 10/2006 | Liao | ........................... | 280/47.22 |
| 7,128,333 B2 * | 10/2006 | Reimers et al. | ............... | 280/651 |
| 7,137,644 B2 * | 11/2006 | Kimberley | ..................... | 280/651 |
| 7,213,830 B2 * | 5/2007 | Liao | ................................ | 280/651 |
| 7,219,920 B2 * | 5/2007 | Lin | ................................ | 280/651 |
| D574,571 S * | 8/2008 | Liao | ............................. | D34/15 |
| D597,274 S * | 7/2009 | Wu | ............................... | D34/15 |
| 7,841,615 B2 * | 11/2010 | Yang | ............................. | 280/652 |
| 7,926,835 B2 * | 4/2011 | Barton | ......................... | 280/658 |
| 7,934,729 B2 * | 5/2011 | Murphy et al. | ............ | 280/47.26 |
| 7,997,595 B1 * | 8/2011 | Pope | ........................... | 280/47.26 |
| 8,104,777 B2 * | 1/2012 | Liao | ................................. | 280/38 |
| 8,191,920 B2 * | 6/2012 | Zhang | .......................... | 280/651 |
| 8,226,112 B2 * | 7/2012 | Liao | ............................. | 280/651 |

(Continued)

*Primary Examiner* — Jeffrey J Restifo
*Assistant Examiner* — Erez Gurari
(74) *Attorney, Agent, or Firm* — Alan Kamrath; Kamrath IP Lawfirm, P.A.

(57) ABSTRACT

A golf bag cart comprises a lower frame including a connecting plate pivotally coupled to a rear wheel stand, a slide element installed at the top of the connecting plate, and an upper carrying base and a lower carrying base for placing and fixing a golf bag; an upper frame coupled to a lower frame and pivotally coupled to the upper carrying base; two front wheel stands coupled to the lower frame and pivotally coupled to the lower carrying base; a link rod module composed of link rod modules and coupled between the upper frame, a slide element and front and rear wheel stands for driving the front and the rear wheel stands or the front and rear wheels to fold or unfold; and a lift switch installed between the upper and lower frames and latched for fixing at a position when the golf bag cart is unfolded.

4 Claims, 9 Drawing Sheets

U.S. PATENT DOCUMENTS

| | | | |
|---|---|---|---|
| 8,292,321 B2 * | 10/2012 | Liao | 280/652 |
| 2001/0033070 A1 * | 10/2001 | Reimers et al. | 280/651 |
| 2004/0135331 A1 * | 7/2004 | Liao | 280/47.2 |
| 2004/0173980 A1 * | 9/2004 | Yang | 280/47.26 |
| 2004/0195806 A1 * | 10/2004 | Reimers et al. | 280/651 |
| 2010/0052275 A1 * | 3/2010 | Reimers et al. | 280/47.26 |
| 2010/0176577 A1 * | 7/2010 | Liao | 280/651 |
| 2011/0215542 A1 * | 9/2011 | Wang | 280/35 |

* cited by examiner

GOLF BAG CART

BACKGROUND OF THE INVENTION

1. Field of the Invention

The present invention relates to a golf bag cart, and more particularly to the golf bag cart that can be folded or unfolded without unloading the golf bag to provide a simple and convenient operation.

2. Description of the Related Art

With reference to FIG. 1 for a conventional golf cart, the conventional golf cart comprises a folding joint 10 installed between upper and lower frames 1, 2, a connecting plate 20 installed at the middle of the lower frame 2 for connecting two rear wheel stands 21 and a rear wheel 22, an upper carrying base 23 and a lower carrying base 24 disposed at upper and lower ends of the lower frame 2 respectively for fixing a golf bag 3, and a folding joint 25 installed at the bottom of the lower frame 2 for connecting a front wheel stand 26 and a front wheel 27. If a user wants to fold the golf bag cart, the user has to unload the golf bag 3 first, and then fold the front wheel stand 26 and the front wheel 27 upwardly and rotate the two rear wheel stands 21 and the rear wheel 22 forwardly, while folding the upper frame 1 backwardly as shown in FIGS. 2 to 4. On the contrary, if the user wants to unfold the golf bag cart, the user carries out the aforementioned procedure reversely by lifting the upper frame 1 and pulling the rear wheel 22 backwardly as shown in FIG. 3, and unfolding the front wheel 27 downwardly as shown in FIG. 2, and then fixing the golf bag 3 between the upper carrying base 23 and the lower carrying base 24 as shown in FIG. 1 to complete the operation of unfolding the golf cart bag. From the description above, it is inconvenient to fold or unfold the conventional golf bag cart, such as unloading the golf bag before folding the golf car, or loading the golf bag to the cart after the unfolding the cart. Such operations are very inconvenient, particularly for frequent user, thus the conventional golf cart requires improvements.

SUMMARY OF THE INVENTION

Therefore, it is a primary objective of the present invention to provide a golf bag cart that can be folded or unfolded without unloading the golf bag to provide a simple and convenient operation.

Another objective of the present invention is to provide a golf bag cart with a simpler and easier folding or unfolding operation.

To achieve the foregoing objectives, the present invention provides a golf cart bag comprising: a lower frame including a connecting plate pivotally coupled to a rear wheel stand, a slide element installed at the top of the connecting plate, and an upper carrying base and a lower carrying base for placing and fixing a golf bag; an upper frame coupled to a lower frame and pivotally coupled to the upper carrying base; two front wheel stands coupled to the lower frame and pivotally coupled to the lower carrying base; a link rod module composed of link rod modules and coupled between the upper frame, a slide element and front and rear wheel stands for driving the front and the rear wheel stands or the front and rear wheels to fold or unfold; and a lift switch installed between the upper and lower frames and latched for fixing at a position when the golf bag cart is unfolded.

DETAILED DESCRIPTION OF THE PREFERRED EMBODIMENTS

To make it easier for our examiner to understand the technical characteristics and measures of the present invention to achieve the aforementioned objects and effects, we use two preferred embodiments with related drawings for the detailed description of the present invention as follows.

Figure 1:
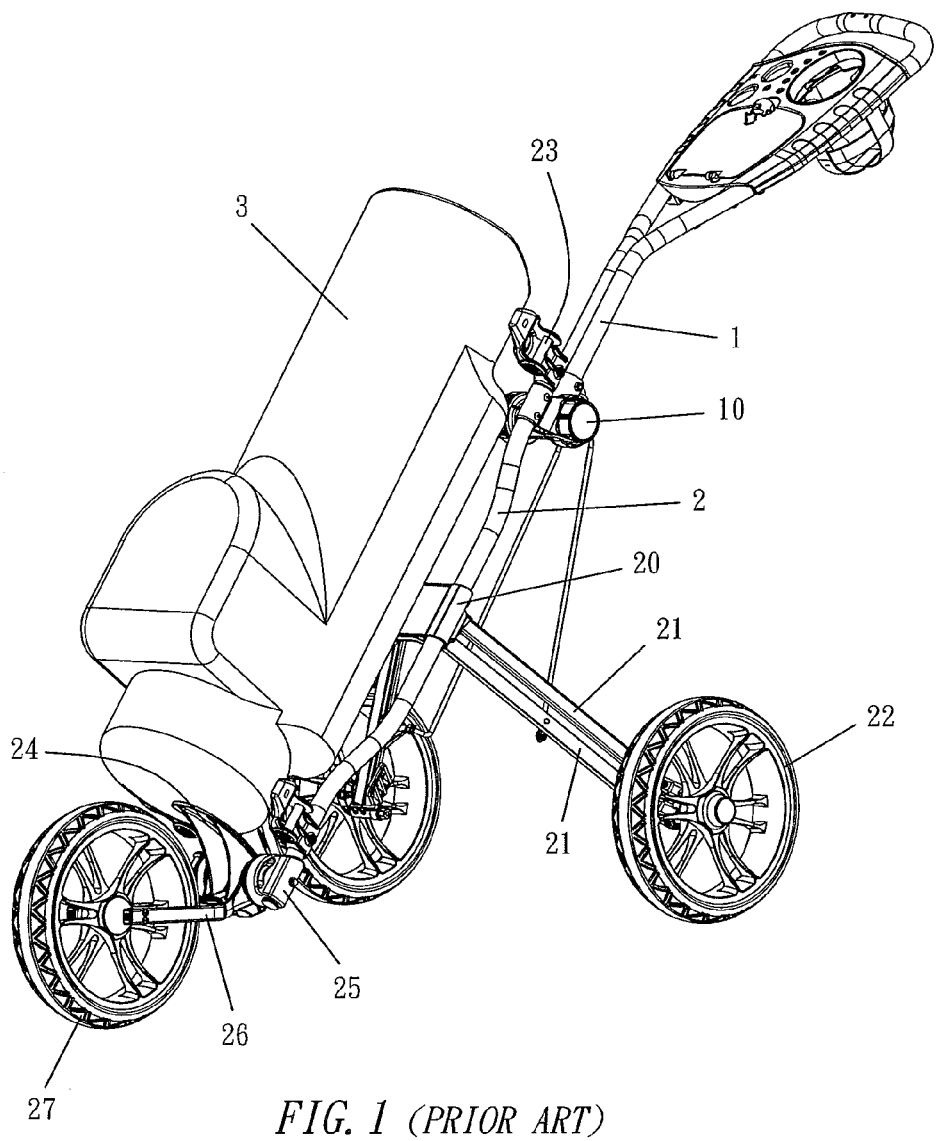
FIG. 1 is a perspective view of a conventional golf bag cart.
Figure 2:
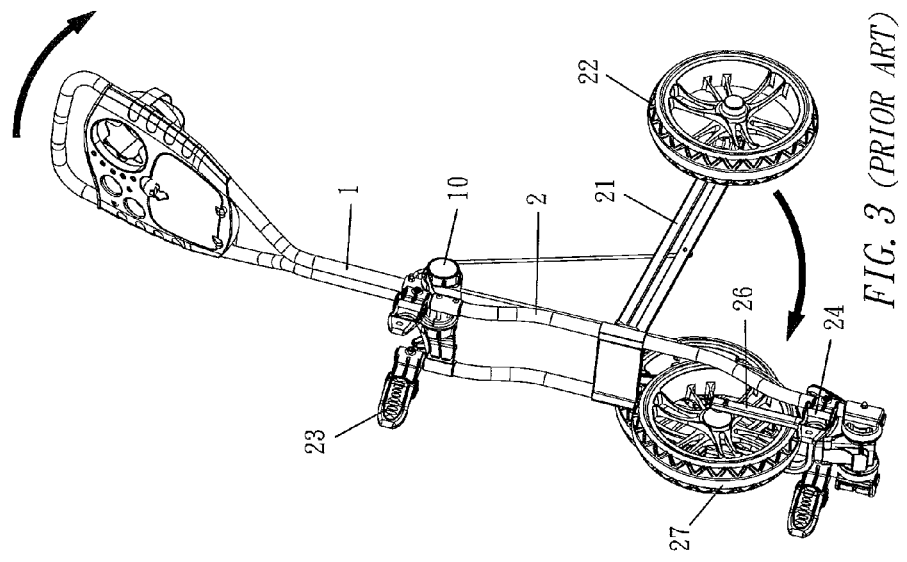
FIG. 2 is a first schematic view of folding a conventional golf bag cart.
Figure 3:
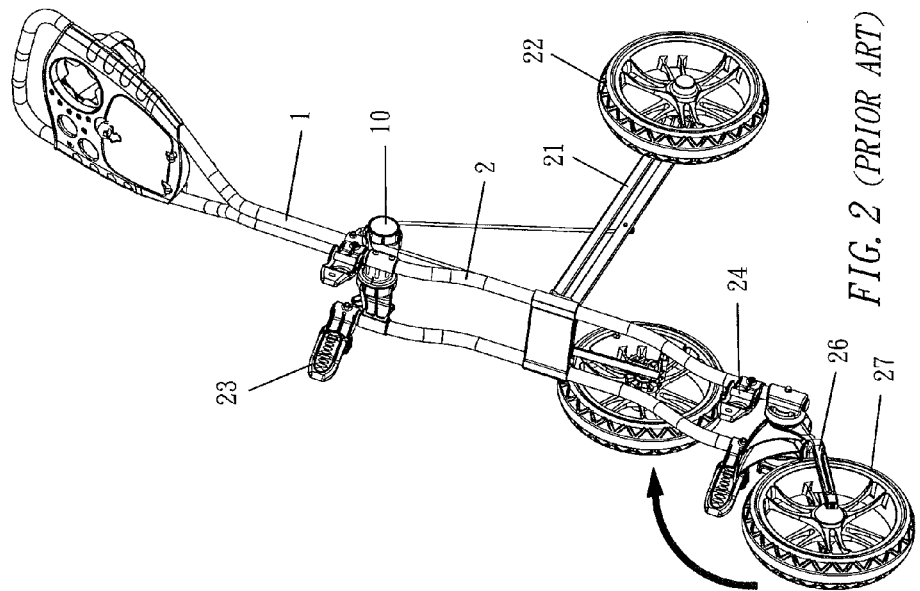
FIG. 3 is a second schematic view of folding a conventional golf bag cart.
Figure 4:
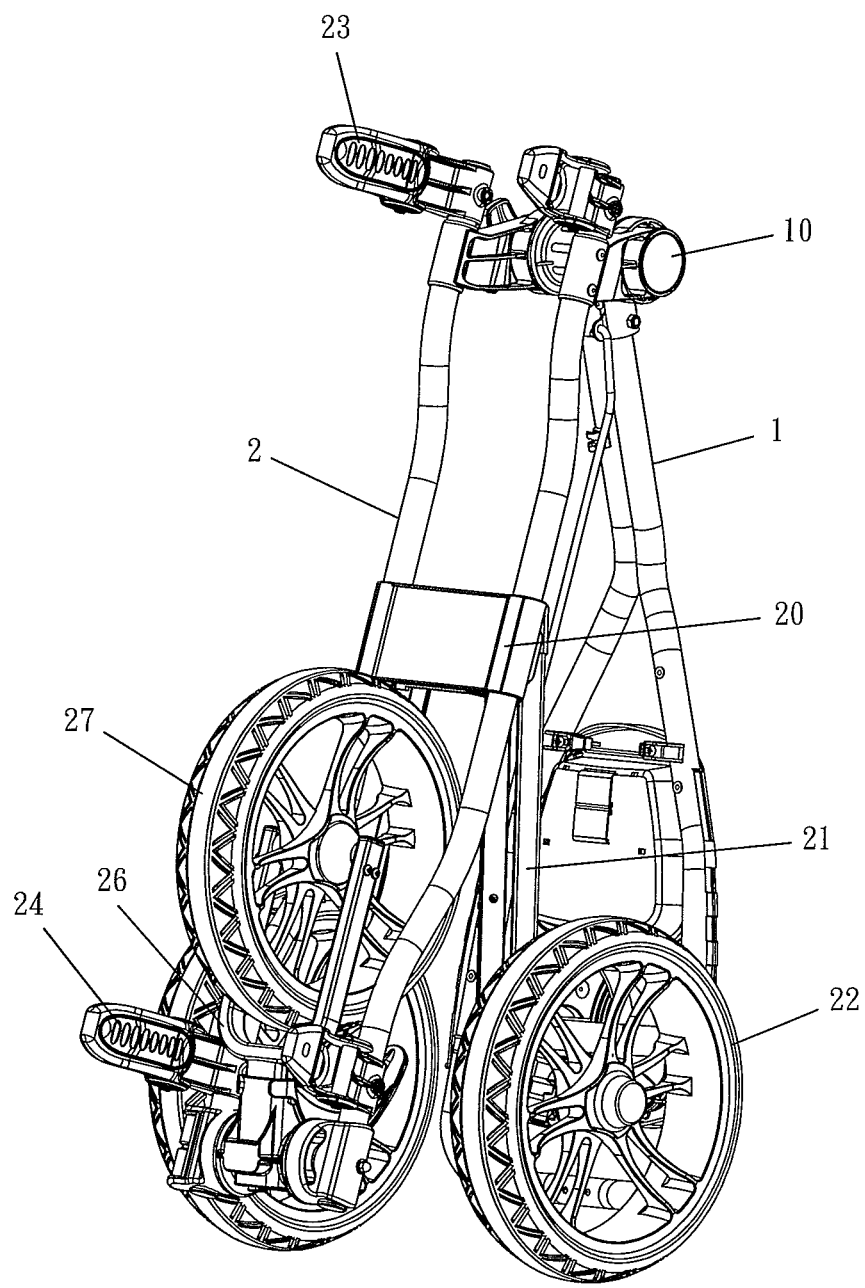
FIG. 4 is a schematic view of a folded state of a conventional golf bag cart.
Figure 5:
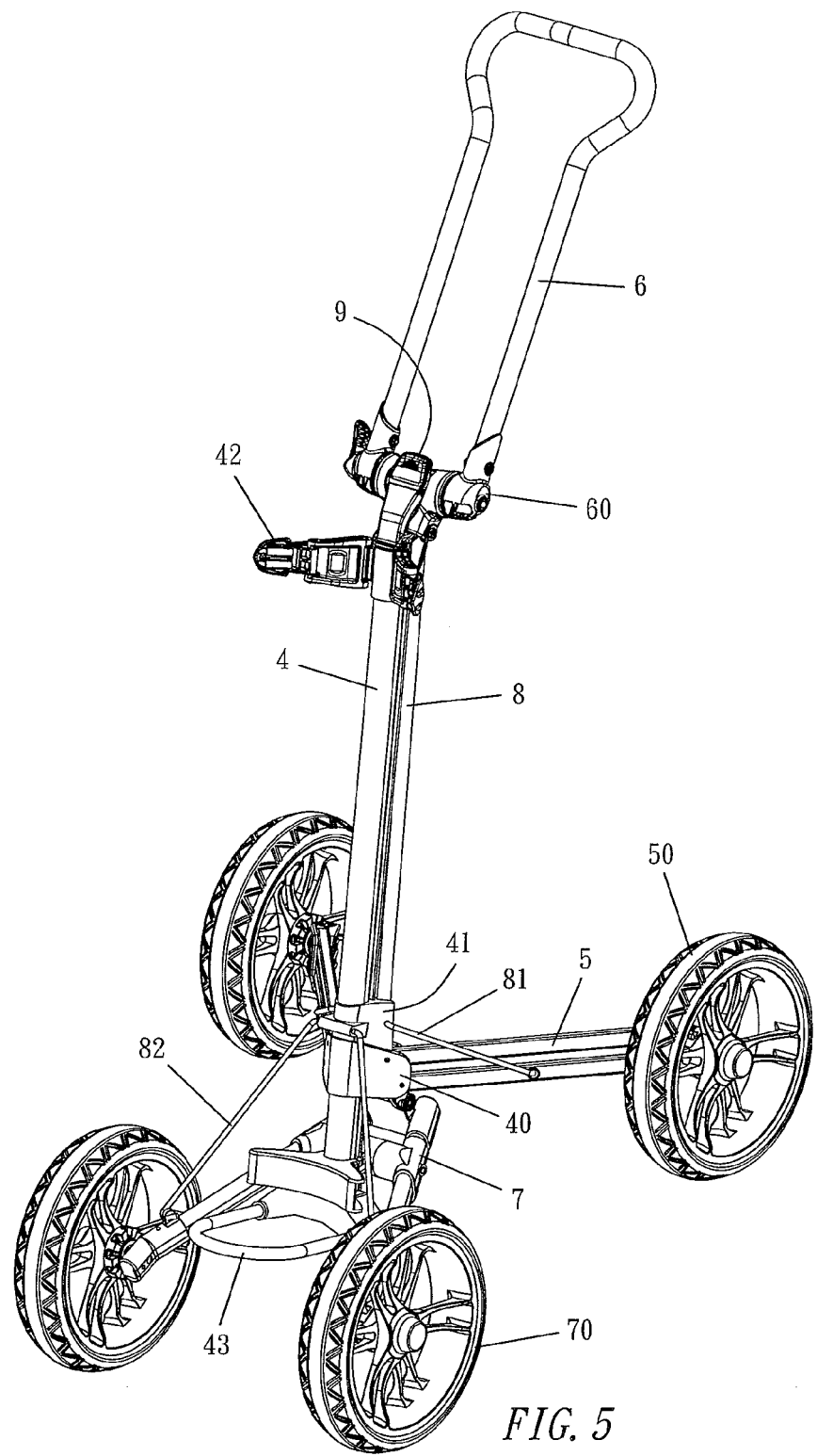
FIG. 5 is a perspective view of the present invention.
Figure 6:
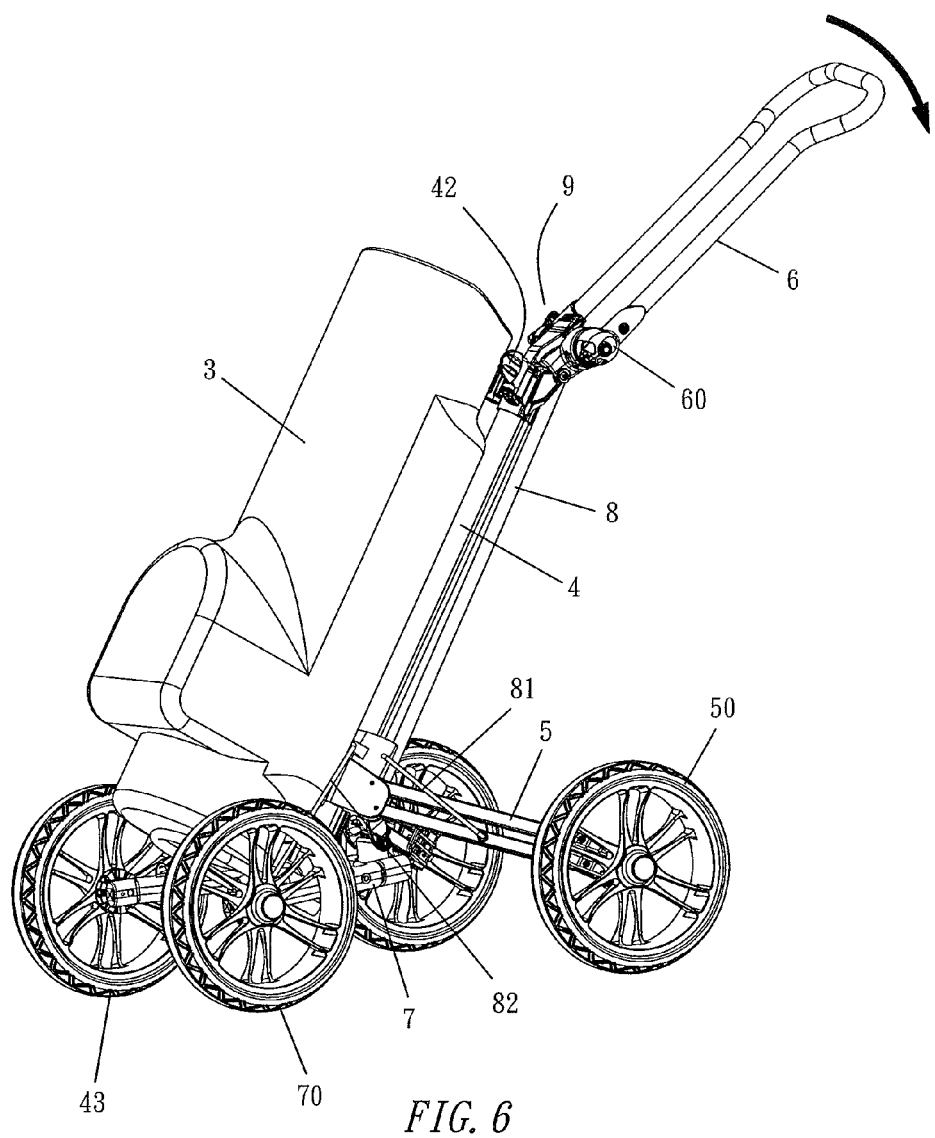
FIG. 6 is a perspective view of the present invention loaded with a golf bag.
Figure 7:
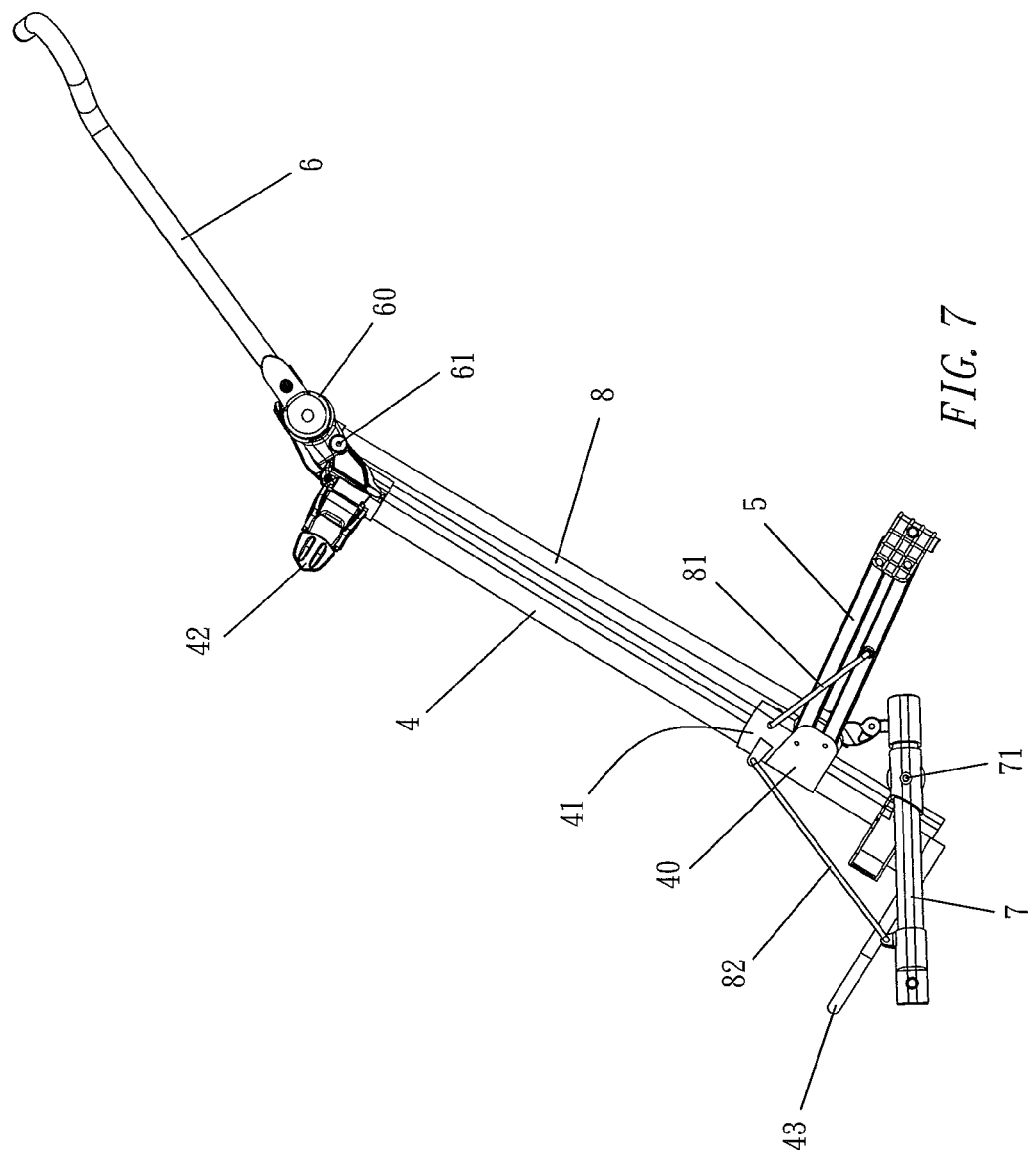
FIG. 7 is a side view of a frame of a golf bag cart of the present invention.
Figure 9:
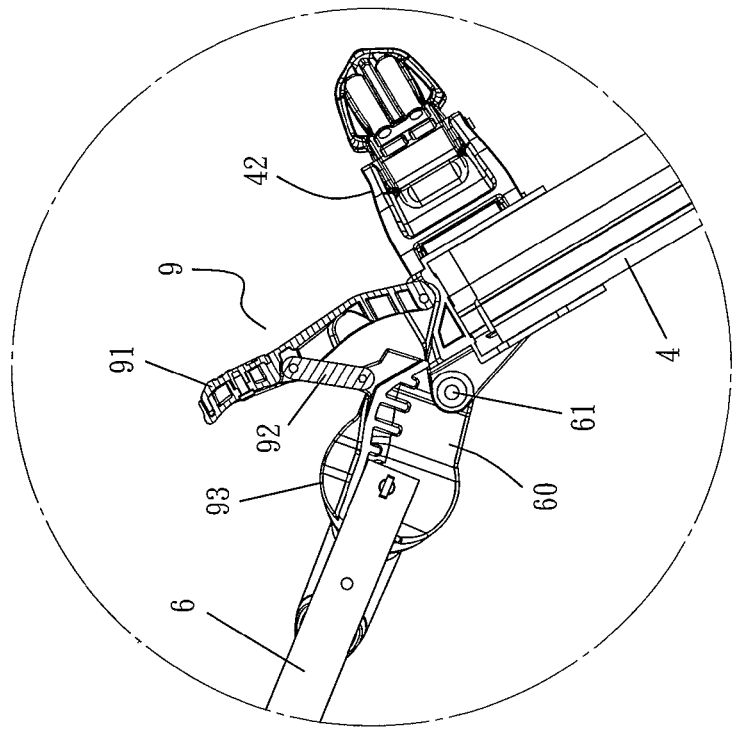
FIG. 9 a cross-sectional view of a lift switch at a released state in accordance with the present invention.
Figure 8:
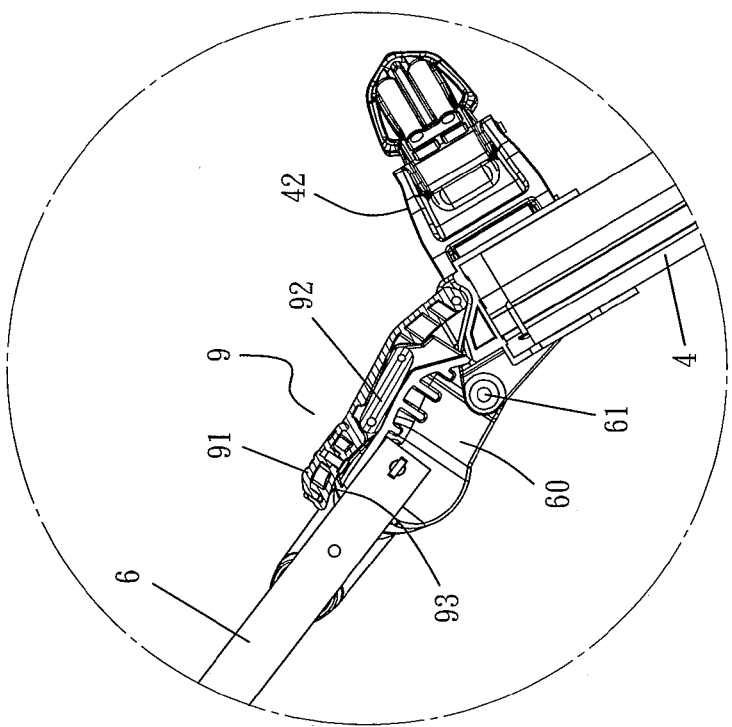
FIG. 8 is a cross-sectional view of a lift switch at a locked state in accordance with the present invention.

With reference to FIGS. 5 to 7, the present invention comprises:

a lower frame 4, having a connecting plate 40, pivotally coupled to two rear wheel stands 5 and a rear wheel 50, a slide element 41, installed onto the lower frame 4, and disposed at the top of the connecting plate 40, and an upper carrying base 42 and a lower carrying base 43, fixed at upper and lower ends of the lower frame 4 respectively for placing and fixing a golf bag 3;

an upper frame 6 (which is a handlebar tube), coupled to the lower frame 4 by a joint 60, and having a shaft 61 pivotally coupled to a shaft of the upper carrying base 42 (lower frame 4) to act as a rotating point of the upper frame 6;

two front wheel stands 7, symmetrically installed on both left and right sides of the bottom of the lower frame 4 respectively, and having a front wheel 70 installed at an end (or a front end) and a shaft 71 installed at the other end (or a rear end) and coupled to a shaft of the lower carrying base 43 (lower frame 4) to act as a rotating point of the front wheel stand 7;

a link rod module, composed of first, second and third link rods 8, 81, 82, and the first link rod 8 being installed at an inner side of the lower frame 4, and the upper and lower ends being axially coupled to the upper frame 6 and the front wheel stand 7, and both ends of the second link rod 81 being coupled to the slide element 41 and the two rear wheel stands 5 respectively, and both ends of the third link rod 82 being coupled to the slide element 41 and the two front wheel stands 7; and a lift switch (as shown in FIGS. 8 and 9), installed between the upper and lower frames 6, 4, and having a lift plate 91 with an end pivotally coupled to the upper carrying base 42 (which is the lower frame 4), a link rod plate 92 installed at the middle and pivotally coupled of the upper frame 6, and the upper frame 6 having a latch 93 installed thereon for latching the lift plate 91 to latch the upper and lower frames 6, 4 when the golf bag cart is unfolded.

Figure 11:
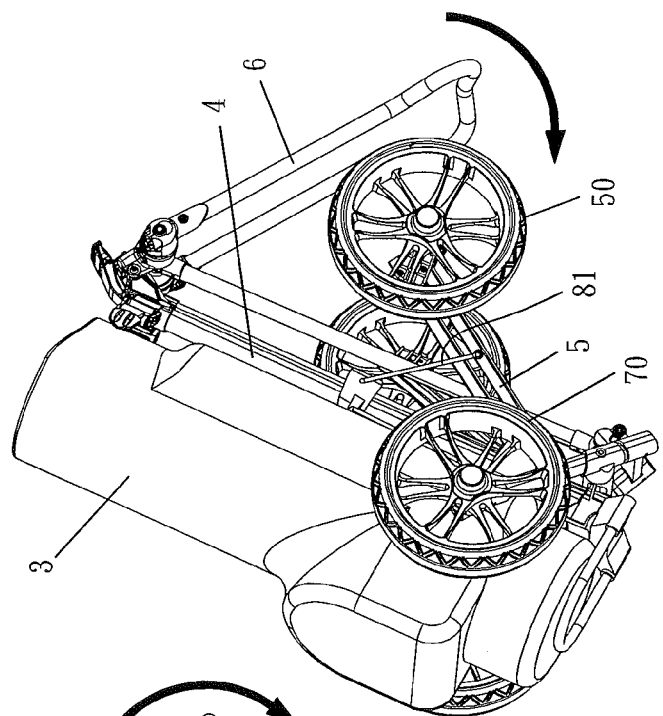
FIG. 11 is a second schematic view of folding the present invention.
Figure 10:
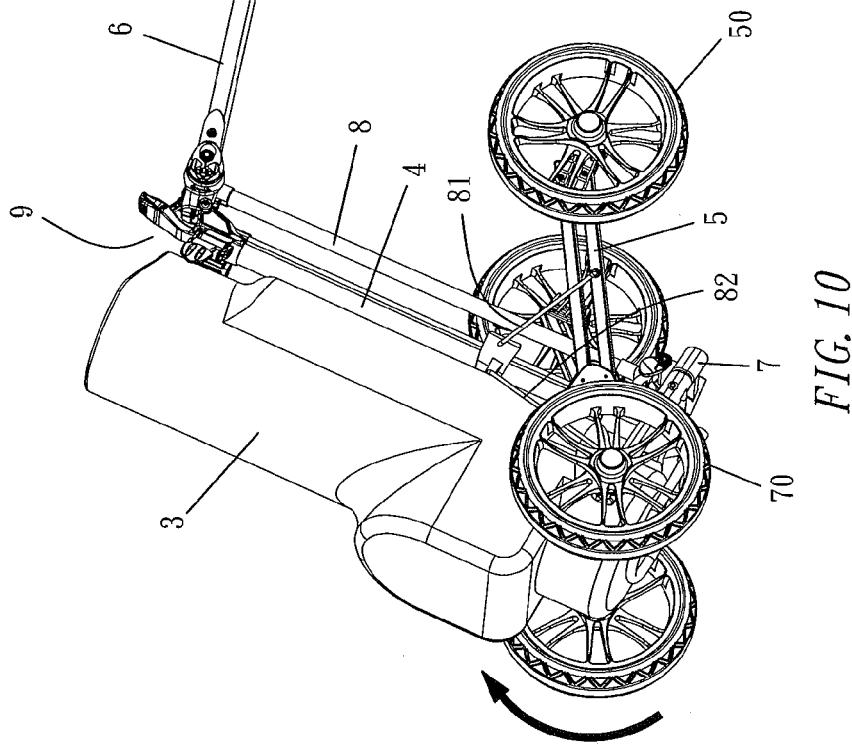
FIG. 10 is a first schematic view of folding the present invention.
Figure 12:
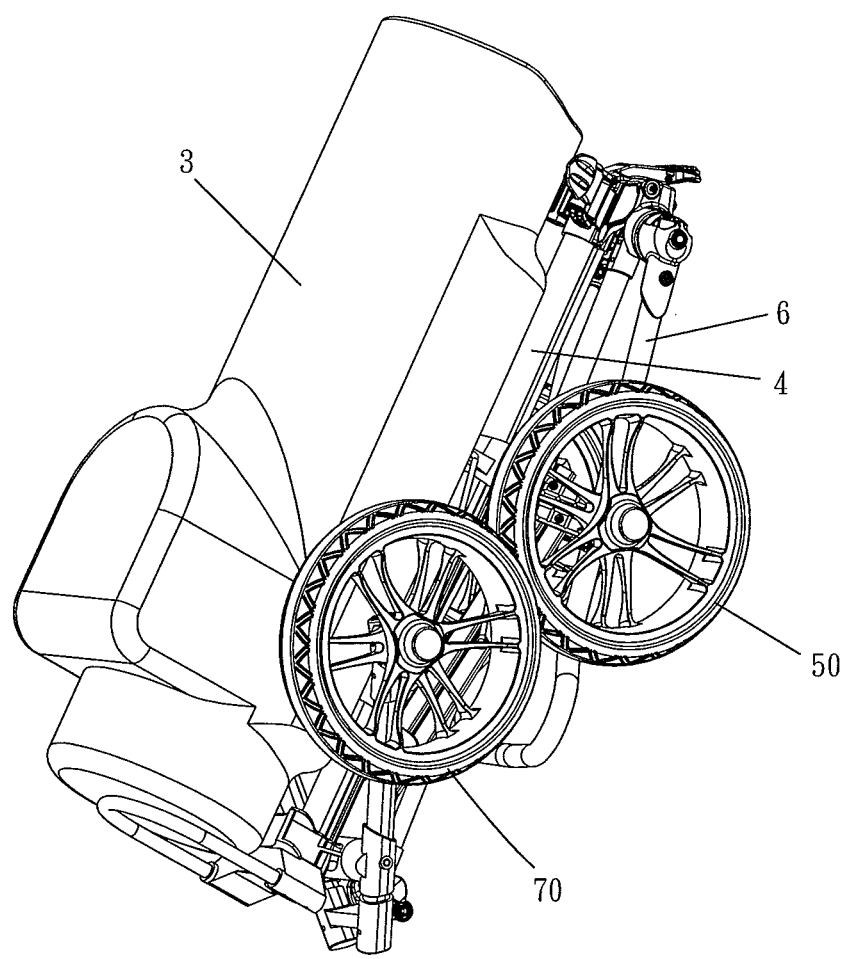
FIG. 12 is a schematic view of a folded state of the present invention.

During the operation of unfolding a golf bag cart with the aforementioned structure, the golf bag 3 is placed and fixed between the upper carrying base 42 and the lower carrying base 43, and the two front wheel stands 7 and the front wheel 70 are disposed on both sides of the bottom of the golf bag 3 respectively as shown in FIG. 6, such that both front and rear wheels of the gold bag cart of the present invention are unfolded to their operating positions, and the lift switch 9 is locked as shown in FIG. 9. If a user wants to fold the golf bag cart, the user releases the lift switch 9 as shown in FIG. 10, and then turns the upper frame 6 downwardly to the rear as indicated by the arrow of FIG. 6, and then the first link rod 8 links the front wheel stand 7 to rotate clockwise, while the third link rod 82 drives the slide element 41 to linearly slide on the lower frame 4, and the second link rod 81 drives the rear wheel stand 5 to turn upward to achieve the effect of folding the frames completely as shown in FIGS. 10 to 12. On the contrary, if the user wants to unfold the golf bag cart, the user lifts the upper frame 6, and the first, second and third link rods 8, 81, 82 synchronously drive the front and rear wheel stands 7, 5 to unfold the front and rear wheels 70, 50 respectively to resume the status as shown in FIG. 6, and then the lift switch 9 is locked as shown in FIG. 9 to achieve the effect of unfolding the gold bag cart.

In summation of the description above, the present invention improves over the prior art and has the following advantages and effects.

1. Regardless of the folding or unfolding operation, it is not necessary to unload the golf bag 3 from the golf bag cart. In other words, the golf bag 3 is always fixed onto the gold bag cart during these operations, so that the operation becomes simpler, easier and more convenient, particularly for frequent users to save much time.

2. During the folding operation, the lift switch 9 is released, and then the upper frame 6 is lifted to synchronously drive the front and rear wheels 70, 50 to fold. During the unfolding operation, the upper frame 6 is lifted to synchronously drive the front and rear wheels 70, 50 to unfold to a fixed position, and then the lift switch 9 is locked to unfold the upper and lower frames 6, 4 at fixed positions. The operation is simpler, more convenient and quicker than the conventional golf bag cart.

Therefore, the present invention complies with the patent application requirements, and is thus duly filed for patent application.

What is claimed is:

1. A golf bag cart, comprising:
   a lower frame, including a connecting plate pivotally coupled to a rear wheel stand, a slide element installed at the top of the connecting plate, and an upper carrying base and a lower carrying base for placing and fixing a golf bag;
   an upper frame, coupled to a lower frame, and pivotally coupled to the upper carrying base;
   two front wheel stands, coupled to the lower frame, and pivotally coupled to the lower carrying base;
   a link rod module, composed of a plurality of link rod modules, and coupled between the upper frame, a slide element and front and rear wheel stands, for driving the front and the rear wheel stands or the front and rear wheels to fold or unfold; and
   a lift switch, installed between the upper and lower frames, and latched for fixing at a position when the golf bag cart is unfolded.

2. The golf bag cart of claim 1, wherein the front wheel stands are installed symmetrically on both left and right sides of the lower frame.

3. The golf bag cart of claim 1, wherein the link rod module comprises:
   a first link rod, installed at an inner side of the lower frame, and the upper and lower ends of the first link rod being coupled to the upper frame and the front wheel stand respectively;
   a second link rod, with both ends coupled to the slide element and the two rear wheel stands respectively; and
   a third link rod, with both ends coupled to the slide element and the two front wheel stands respectively.

4. The golf bag cart of claim 1, wherein the lift switch comprises:
   a lift plate, with an end pivotally coupled to the lower frame;
   a link rod plate, with both ends respectively and pivotally coupled to the lift plate and the upper frame, and
   a latch, installed at the upper frame.

* * * * *